(12) United States Patent
Fabre

(10) Patent No.: US 8,147,200 B2
(45) Date of Patent: Apr. 3, 2012

(54) TURBINE ENGINE WHEEL

(75) Inventor: Adrien Jacques Philippe Fabre, Montrouge (FR)

(73) Assignee: SNECMA, Paris (FR)

( * ) Notice: Subject to any disclaimer, the term of this patent is extended or adjusted under 35 U.S.C. 154(b) by 795 days.

(21) Appl. No.: 12/250,653

(22) Filed: Oct. 14, 2008

(65) Prior Publication Data

US 2009/0104036 A1    Apr. 23, 2009

(30) Foreign Application Priority Data

Oct. 22, 2007   (FR) ...................... 07 07358

(51) Int. Cl.
   *B63H 1/08*    (2006.01)
   *F01D 5/22*    (2006.01)
(52) U.S. Cl. ...................................... 416/185
(58) Field of Classification Search ............ 416/185, 416/223 R, 241 R, 219 R, 244 A, 96 R
   See application file for complete search history.

(56) References Cited

U.S. PATENT DOCUMENTS

| | | | |
|---|---|---|---|
| 6,180,232 B1 * | 1/2001 | McCullough et al. | 428/379 |
| 2005/0106019 A1 * | 5/2005 | Lardellier | 416/96 R |
| 2007/0080041 A1 * | 4/2007 | Goto et al. | 192/87.11 |

FOREIGN PATENT DOCUMENTS

| | | |
|---|---|---|
| DE | 101 63 951 C1 | 12/2002 |
| EP | 0 463 955 A1 | 1/1992 |
| EP | 1 439 282 A1 | 7/2004 |
| FR | 2 095 458 | 2/1972 |
| FR | 2 893 093 | 5/2007 |
| GB | 2 410 984 A | 8/2005 |

* cited by examiner

Primary Examiner — Thomas L Dickey
Assistant Examiner — Nikolay Yushin
(74) *Attorney, Agent, or Firm* — Oblon, Spivak, McClelland, Maier & Neustadt, L.L.P.

(57) ABSTRACT

A wheel of a turbine engine such as an airplane turbojet is disclosed. The wheel includes a disk having blades and at least one ring of a metal matrix composite material mounted on the disk in order to take up centrifugal forces during operation. The wheel further includes at least one annular flange formed by sections arranged end-to-end and each including a radially internal annular portion applied on a flank of the disk and a radially external portion coming into contact with the ring in order to ensure the axial holding of the latter on the disk, and a device for radially holding flange sections on the disk.

11 Claims, 5 Drawing Sheets

TURBINE ENGINE WHEEL

BACKGROUND OF THE INVENTION

1. Field of the Invention

The present invention relates to a turbine engine wheel, such as an airplane turbine engine, and more specifically to the attachment of centrifugal force take-up rings on such a wheel.

2. Description of the Related Art

Each wheel of a turbine engine includes a series of blades attached to or formed on a rotor disk that is secured to a rotating shaft. In operation, the blades exert, on the rotor disk, very high centrifugal forces, making it necessary to size the disk so that it can withstand forces with a certain margin of safety. This large sizing increases the mass of the disk.

To overcome this disadvantage, it is known to use rings made of a metal matrix composite (MMC) material, which are mounted on the rotor disks so as to withstand the centrifugal forces exerted during operation by the blades on the disks, enabling the disks to be lightened.

These rings have the special feature of being both lightweight and very resistant, enabling them to absorb the centrifugal forces due to the mass of the blades at high rotation speeds, so that the disk is subjected to a reasonable load.

The axial holding of the rings of metal matrix composite (MMC) material traditionally requires drilling the disk for the passage of screws or bolts, which drilling is a source of overstress generally making the sizing of the parts tricky, or requires machining of the ring that is difficult to perform and that increases the risks of poor quality.

BRIEF SUMMARY OF THE INVENTION

The invention is intended in particular to provide a simple, economical and effective solution to these problems, enabling the disadvantages of the prior art to be overcome.

It relates in particular to a device for axially holding rings of a metal matrix composite material, which enables the use of non-machined rings with a simple shape, such as rings with a rectangular cross-section free of drilling or attachment means.

It thus proposes a wheel of a turbine engine such as an airplane turbojet, including at least one rotor disk having blades and at least one ring of a metal matrix composite material mounted on the disk in order to take up centrifugal forces during operation, characterized in that it includes at least one annular flange formed by sections arranged end-to-end and each including a radially internal annular portion applied on a flank of the disk and a radially external portion coming into contact with the ring in order to ensure the axial holding of the latter on the disk, which wheel also includes means for radially holding the flange sections on the disk.

The annular flange according to the invention enables the axial holding of rings with a simple geometric shape, such as rings with a rectangular cross-section free of attachment members.

In addition, the sectoring of the flange facilitates its assembly at the periphery of the rotor disk.

According to another feature of the invention, the means for radially holding flange sections include hooks formed on the disk and in which the internal annular portions of the flange sections are radially engaged from the inside, and a resilient annular snap ring applied on the disk and on the radially internal periphery of the flange sections.

The hooks of the disk thus enable the flange to be radially locked toward the outside, while the resilient annular snap ring enables the flange to be radially locked toward the inside.

Advantageously, the snap ring, at rest, has a diameter larger than the internal diameter of the flange, and is radially split.

Therefore, the snap ring must be compressed in order to be positioned in contact with the radially internal periphery of the flange sections, so that the resilience of the snap ring tends to press it against the flange sections and to push the latter outward.

The snap ring preferably comprises at least two lugs arranged on each side of the radial slot and intended to be inserted into recesses with a complementary shape formed in the internal periphery of the flange sections.

These lugs are intended to prevent the rotation of the snap ring with respect to the flange so as to reduce the wear of said snap ring and the surfaces of the flange and the disk in contact with the snap ring.

According to another feature of the invention, the centers of gravity of the flange sections are axially spaced apart from their points of contact on the radial holding means provided on the disk so that the centrifugal forces exerted, during operation, on the flange sections cause the radially external portions of the flange sections to pivot toward the ring.

Therefore, the flange exerts an axial force for holding the ring on the disk.

The internal periphery of the flange sections and the face of the snap ring in contact with this internal periphery preferably form an angle of around 45 degrees with the flank of the disk.

This tilt of the contact surface between the snap ring and the flange sections makes it possible to increase the tendency of the radially external portions of the flange sections to pivot toward the ring, and therefore to increase the axial force exerted by the flange on the ring.

The flange, which is advantageously made of a metal material such as a titanium or nickel alloy or steel, preferably includes 6 to 20 sections.

This number of sections in particular enables a simple assembly of the flange on the periphery of the disk, in which the choice of material forming the flange is advantageous in consideration of the mechanical and thermal stresses to which said flange may be subjected.

The snap ring is also preferably made of a metal material such as a titanium, nickel or steel alloy.

It advantageously comprises a coating with a low coefficient of friction on its surfaces in contact with the flange and with the disk.

Such a coating makes it possible to reduce the friction of the snap ring on the flange and the disk, and the wear of their contact surfaces that would result therefrom.

The invention also relates to a turbine engine, characterized in that it includes at least one compressor, turbine or centrifugal impeller wheel according to the features described above.

BRIEF DESCRIPTION OF THE SEVERAL VIEWS OF THE DRAWINGS

The invention can be better understood, and other details, advantages and features thereof will become clearer on reading the following description provided as a non-limiting example, in reference to the appended drawings, in which.

DETAILED DESCRIPTION OF THE INVENTION

Figure 1:
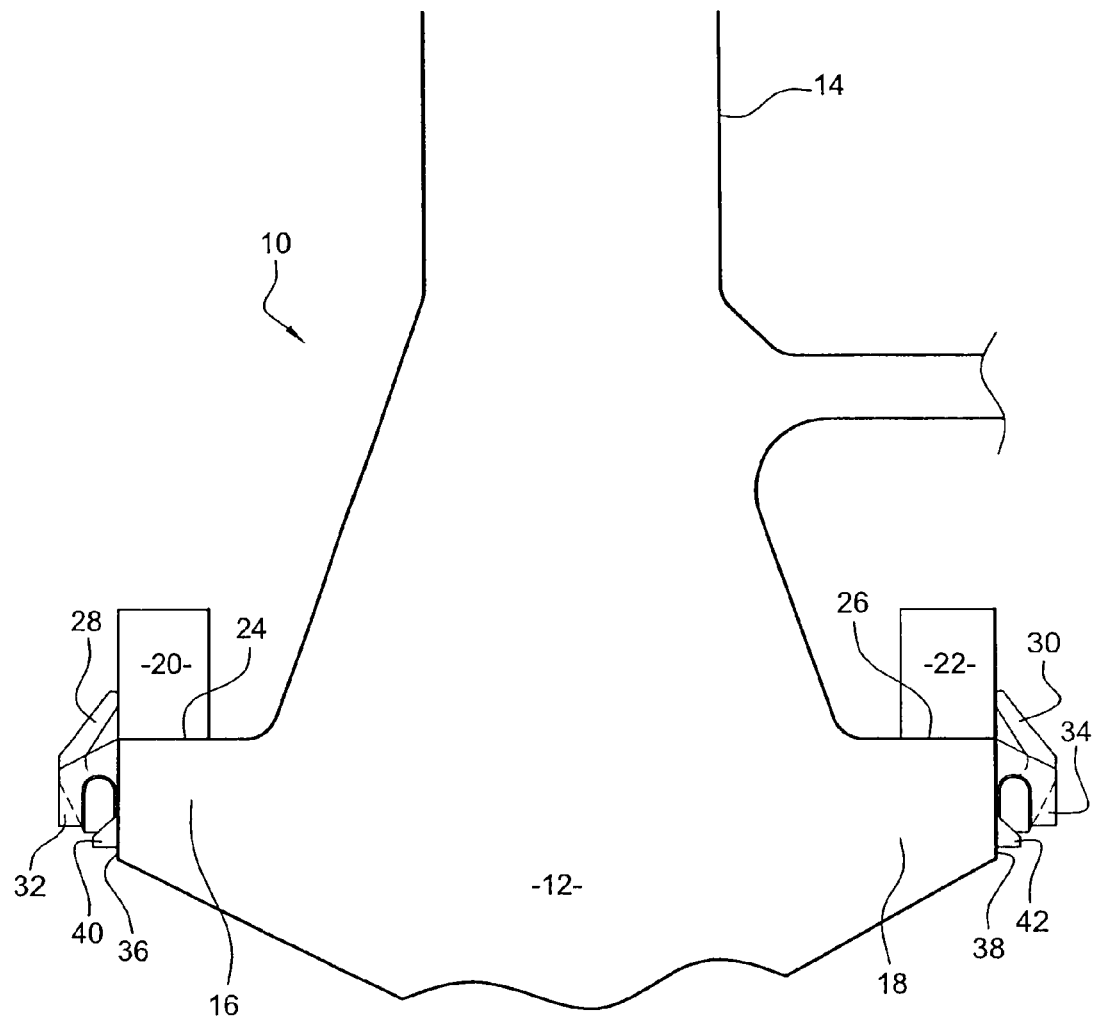
FIG. 1 is a partial diagrammatic view of an axial cross-section of a turbine engine wheel according to the invention.

FIG. 1 shows a turbine engine wheel 10, such as a compressor or turbine, or a centrifugal impeller wheel. This wheel 10 includes a disk 12, which is traditionally made of an alloy of titanium or nickel or any appropriate material, and which has, at its periphery, blades 14 that, in the example shown, are machined directly in the disk 12, but that can also be attached to the disk by "broach", "hammer" or "fir tree fitting" attachments, for example, without going beyond the scope of the invention.

The disk 12 includes an upstream annular edge 16 and a downstream annular edge 18, which are surrounded by rings of metal matrix composite (MMC) material, respectively upstream 20 and downstream 22, intended to take up the centrifugal forces generated by the blades 14 when the disk is rotating.

These rings 20, 22 are, for example, made of silicon carbide fibers in a titanium-based matrix, but they can also be made with other types of fibers, such as boron or alumina carbide fibers, and other types of matrices, for example, nickel-based matrices.

This structure confers better mechanical properties on the rings 20, 22 than the disk 12, and enables them to effectively take up the centrifugal forces transmitted by the blades 14 on the disk 12, which can be very significant in consideration of the high rotation speeds of the turbine engine wheels.

The rings 20, 22 have a rectangular cross-section and rest on the external peripheral faces 24 and 26 of the edges 16 and 18 of the disk. These rings are axially locked by two annular flanges, respectively upstream 28 and downstream 30, formed by a series of annular sections mounted end-to-end on the radial flanges 36 and 38 of the edges 16, 18 of the disk.

For this, the sections of the annular flanges 28, 30 are engaged in hooks 32, 34 formed respectively on the upstream 36 and downstream 38 flanks of the disk 12, and ensure radial locking of the flange sections toward the outside, which sections are pushed radially outward by two resilient annular snap rings 40 and 42 applied respectively on the flanks 36 and 38 of the disk.

Figure 2:
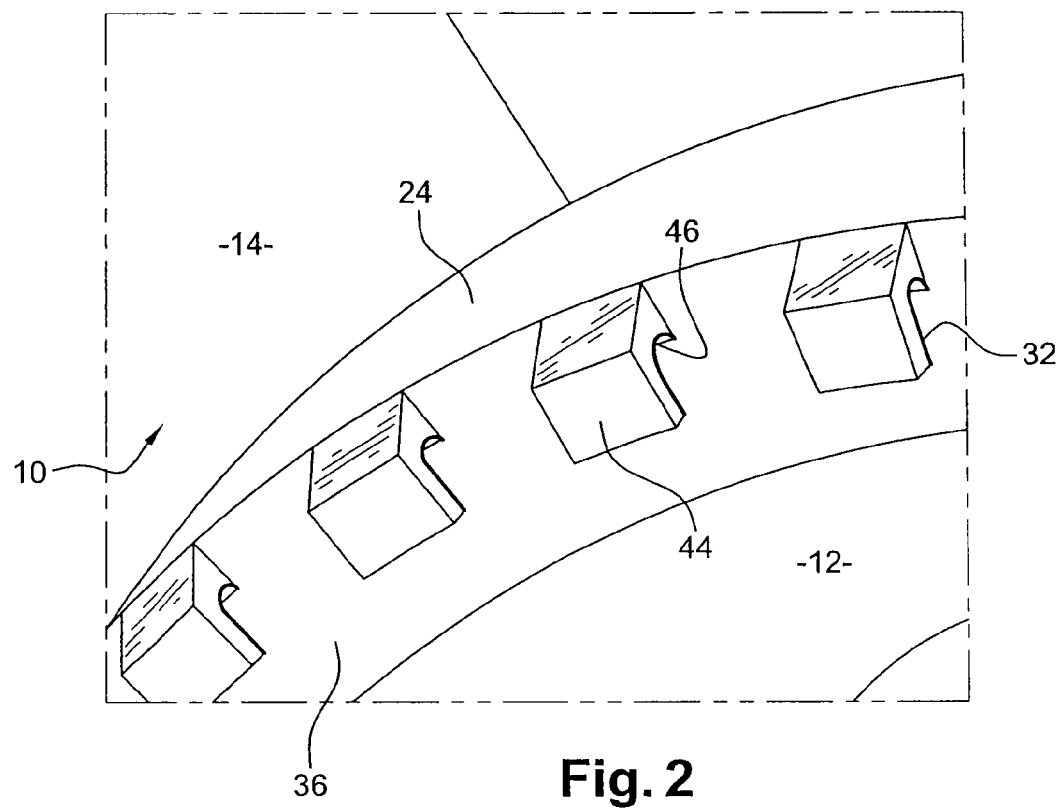
FIG. 2 is a partial diagrammatic perspective view of the turbine engine wheel of FIG. 1.

FIG. 2 shows the upstream flank 36 of the disk 12 of the wheel 10, with the disk being shown without a flange and without a ring. This FIG. 2 makes it possible in particular to distinguish the hooks 32 formed on said upstream flank 36, each of which includes a tab 44 extending radially inwardly, so that all of said hooks 32 together form an annular groove 46 designed to receive a radially internal annular portion 48 with a shape substantially corresponding to the sections of the upstream annular flange 28.

Figure 3:
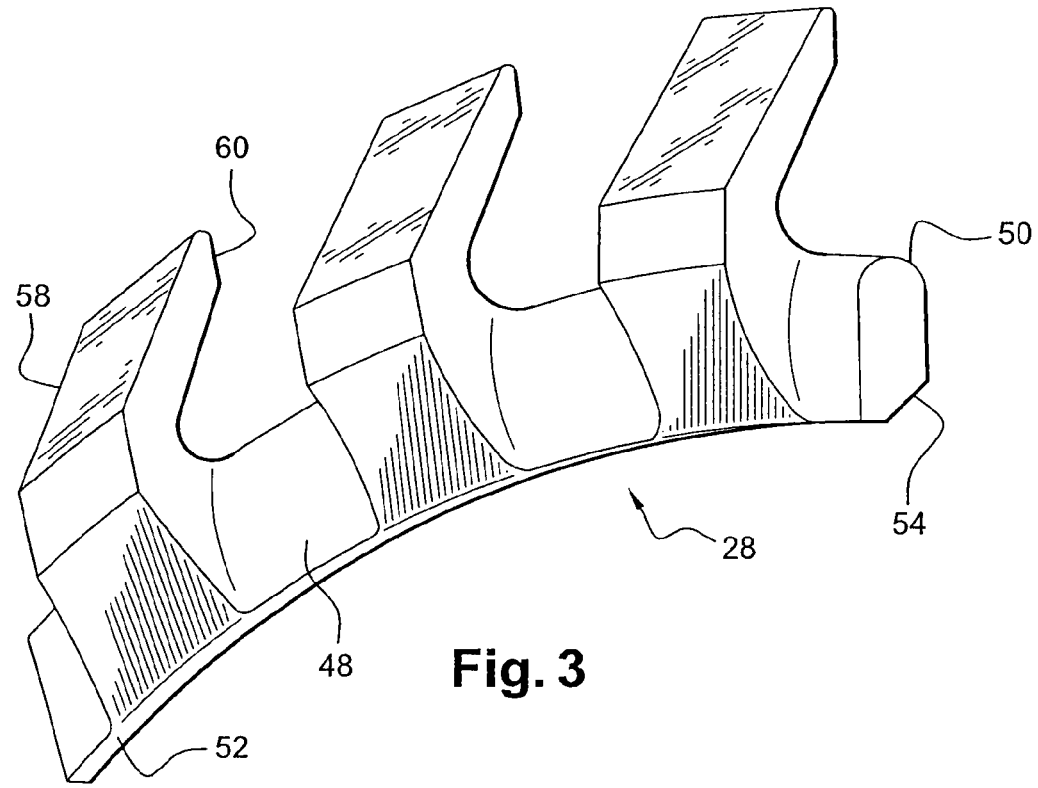
FIG. 3 is a partial diagrammatic perspective view of the turbine engine wheel of FIG. 1.
Figure 4:
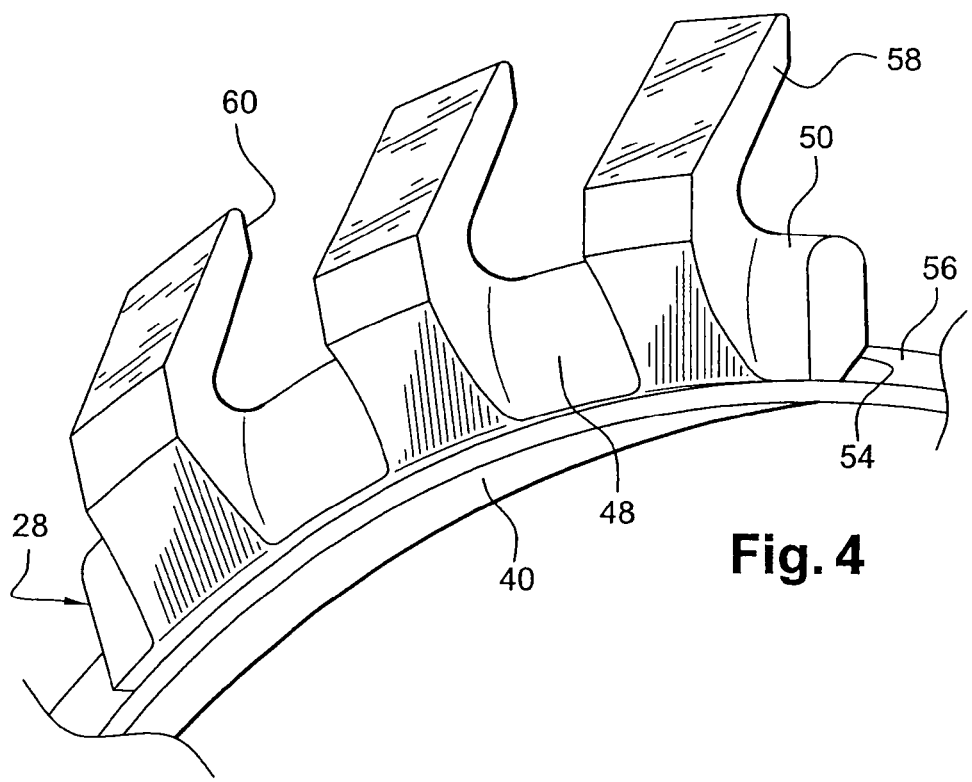
FIG. 4 is a partial diagrammatic perspective view of the turbine engine wheel of FIG. 1.
Figure 5:
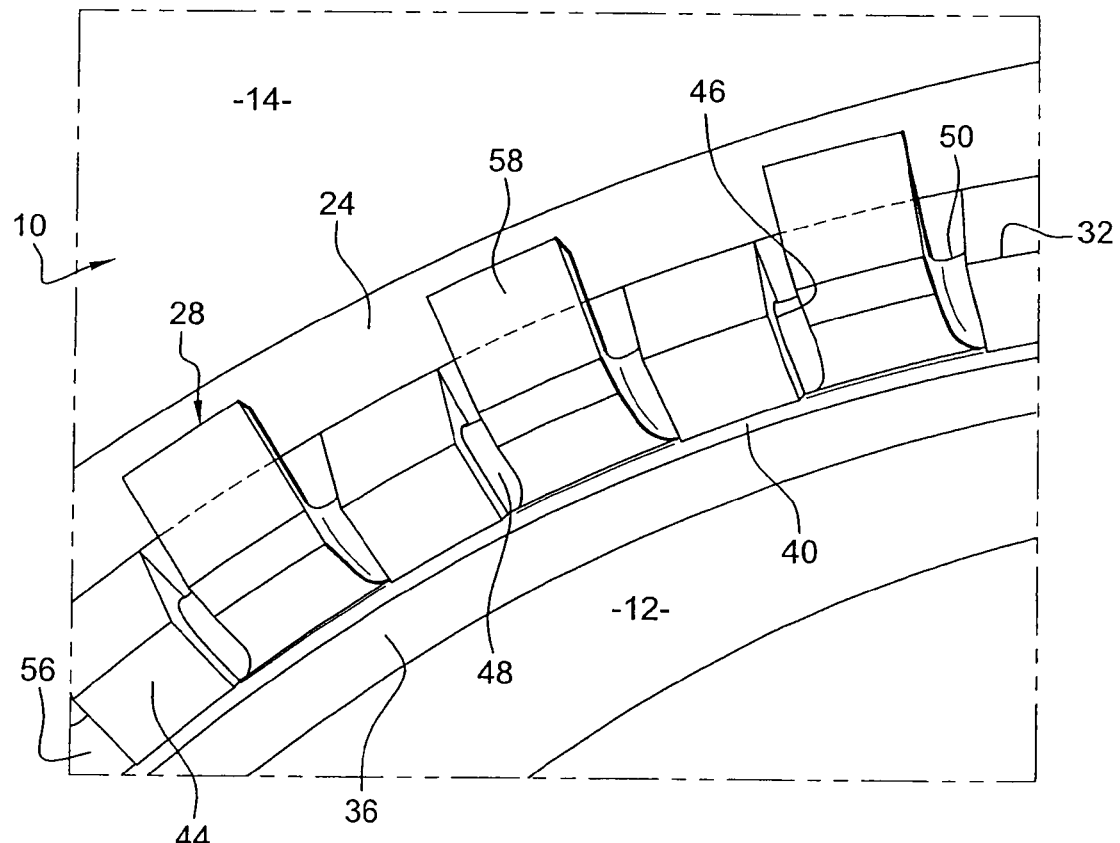
FIG. 5 is a partial diagrammatic perspective view of the turbine engine wheel of FIG. 1.

FIG. 3 shows a section of the upstream annular flange 28, of which the radially internal annular portion 48 comprises an external curved face 50 intended to be applied radially on the base of the annular groove 46 of the disk 12, and a radially internal edge including an upstream face 52 extending axially and an oblique downstream face 54 so that its cross-section increases toward the downstream according to a slope of around 45 degrees, which oblique face 54 forms a contact face of the resilient annular snap ring 40, as best shown in FIGS. 4 and 5.

The flange section 28 also includes tabs 58 extending radially outwardly from the radially internal annular portion 48, in which each tab 58 comprises an axial contact surface 60 facing downstream and intended to be applied on the rings of metal matrix composite material 20 in order to ensure their axial holding.

In general, the material with which the sections of the annular flanges 28, 30 are made can be a titanium or nickel alloy or a steel, or any other metal material capable of withstanding the mechanical and thermal stresses to which the flanges are subjected.

The number of sections needed to form each flange 28, 30 is dependent on the sizing parameters, such as the size of the disk 12, and must in any case be sufficient for facilitating the end-to-end assembly of said sections. This number is, for example, between 8 and 12.

The number of tabs 58 per flange section and the total number of tabs on the circumference of a flange is also determined by sizing parameters.

FIG. 4 shows a section of the annular flange 28 associated with the resilient annular snap ring 40, in which the section and the snap ring are separated, while FIG. 5 shows them mounted on the upstream flank 36 of the disk 12.

Figure 8:
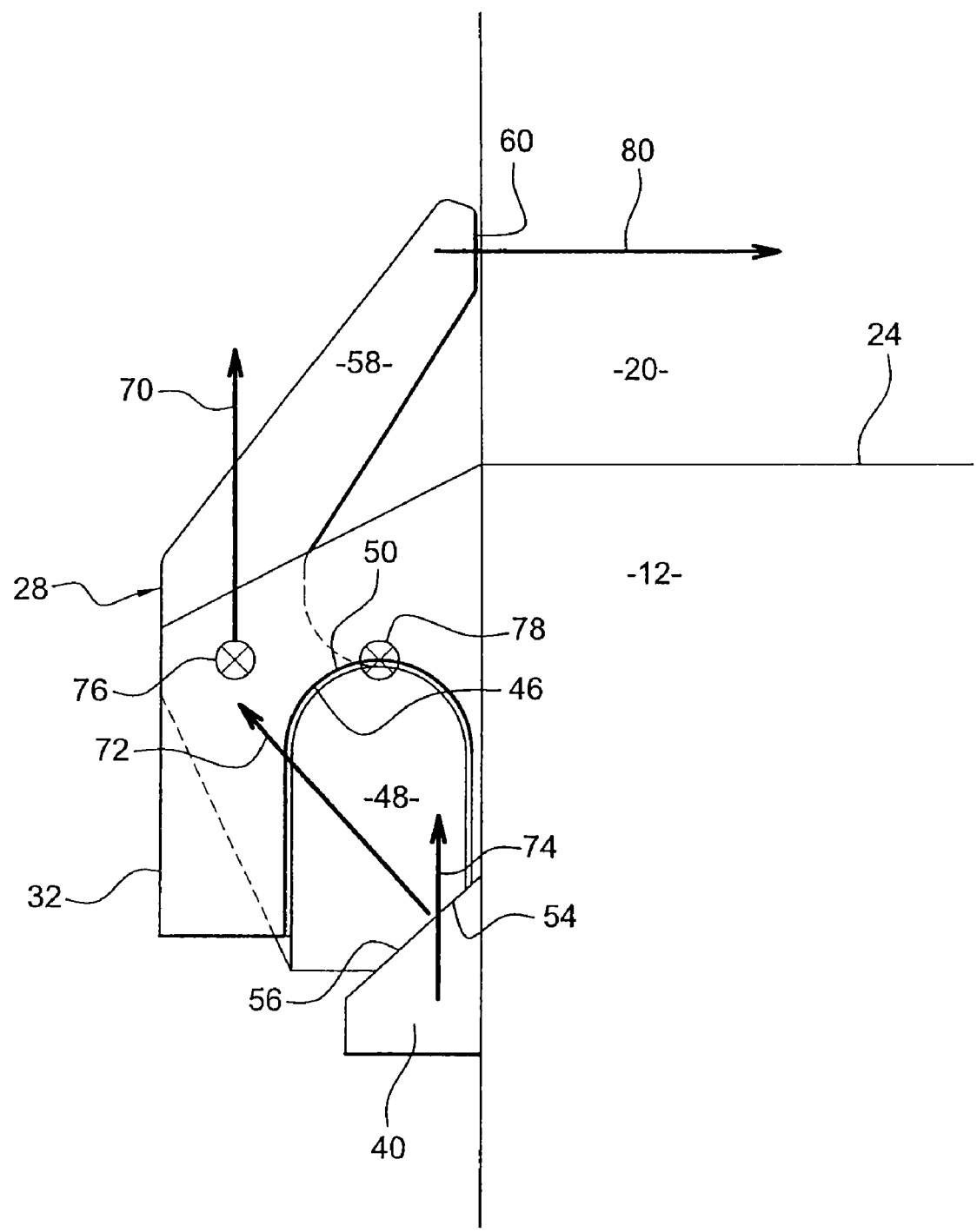
FIG. 8 is a partial diagrammatic view of an axial cross-section showing the axial holding of the ring on the disk.

As best shown in FIG. 8, the snap ring 40 has a substantially triangular cross-section matching the shape of the oblique face 54 of the flange sections.

Figure 6:
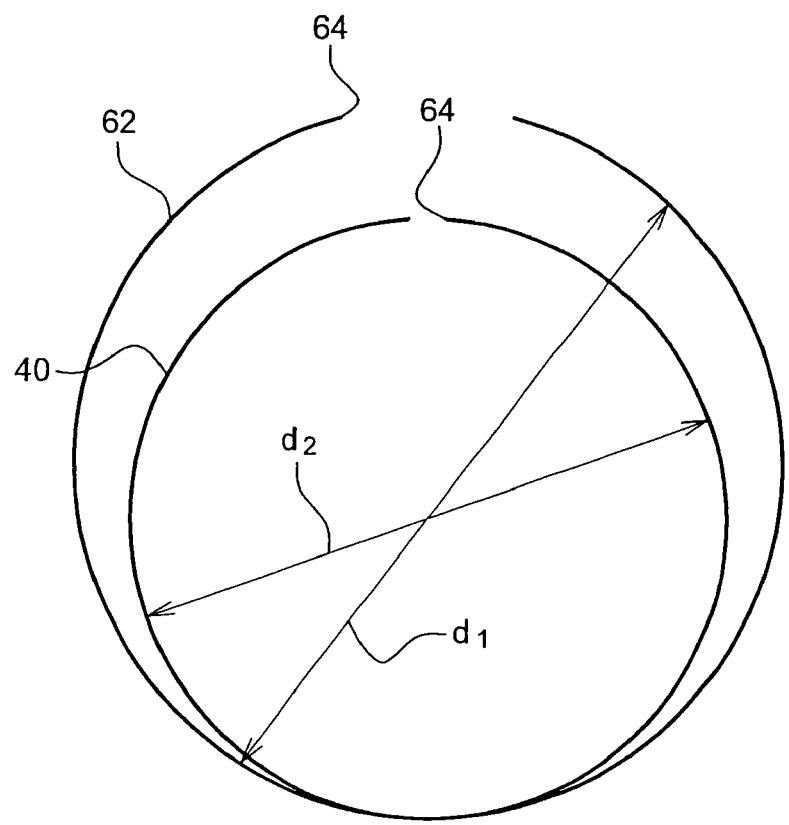
FIG. 6 is a diagrammatic front view of the snap ring in a non-tensioned state and in an assembly position.

As shown in FIG. 6, which shows the resilient annular snap ring in a non-tensioned state 62 and installed 40 on the flange (not shown in this figure), this snap ring comprises a slot 64 and its diameter at rest d1 is greater than its diameter d2 when it is installed under the flange. The assembly of the snap ring 40 in contact with the oblique face 54 of the internal edge of the flange 28 thus requires the snap ring 40 to be retorqued, so that its resiliency then tends to press said snap ring against the internal edge of the flange, and consequently to push the face 50 of the flange on the base of the annular groove 46 of the disk (cf. FIG. 5), while preventing the snap ring from coming out of its recess under the flange.

Figure 7:
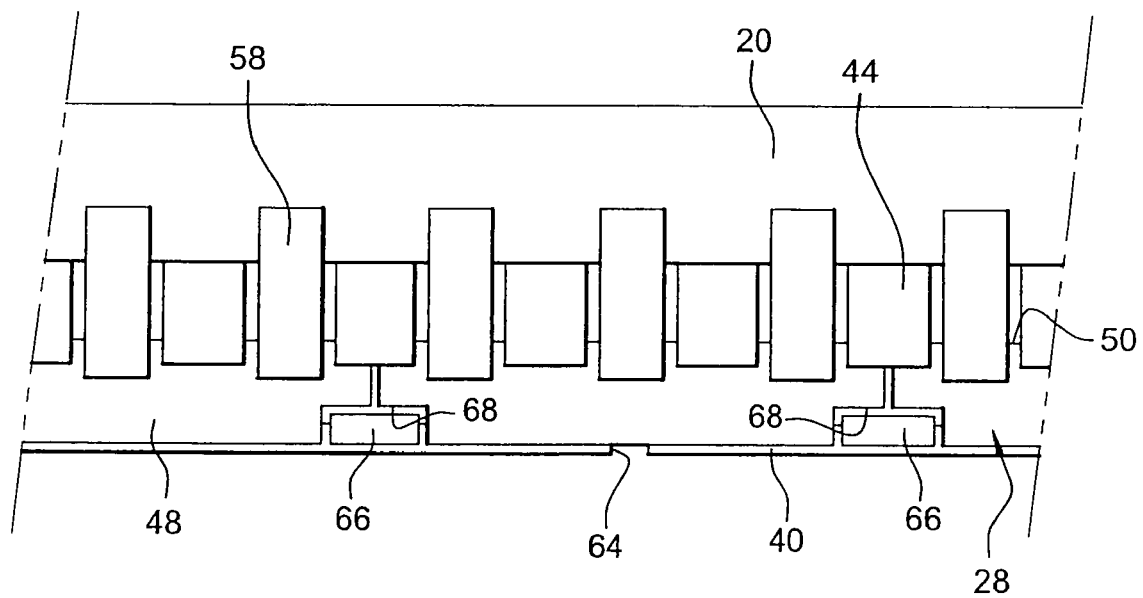
FIG. 7 is a partial front view showing the assembly of the snap ring on the flange.

In addition, as shown diagrammatically in FIG. 7, the snap ring 40 includes two lugs 66 arranged on each side of the slot 64 and intended to be engaged in corresponding recesses 68 of the flange sections 28 in order to prevent the snap ring 40 from rotating with respect to the flange 28.

The resilient annular snap ring 40 can then, for example, be made of a titanium or nickel alloy or a steel, and can also comprise a coating with a low coefficient of friction, of a known type, on its faces in contact respectively with the flange and with the disk in order to reduce the friction between the various part sand thus limit the wear of these parts.

As mentioned above, the resilient annular snap rings 40, 42 are first intended to ensure the radial holding of the flange sections 28, 30, in particular when the turbine engine is stopped and the flange sections are not pressed into their respective annular grooves 46 under the effect of centrifugal forces during operation of the turbine engine.

FIG. 8 is a cross-section view of a section of the upstream annular flange 28 mounted on the disk 12, during operation of the turbine engine, and shows in particular the transmission of the centrifugal forces in the various parts in relation to the flange 28.

The flange section 28 is subjected to a centrifugal force 70 that results from its rotation and a force 72 applied to said flange section by the resilient annular snap ring 40.

Indeed, said snap ring 40 is also subjected to a centrifugal force 74 due to its rotation, and it transmits a component 72 to the oblique face 54 of the internal edge of the flange section via its external face 56 with a corresponding shape. Since the flange section 28 is axially locked due to the engagement of its radially internal portion 48 in the annular groove 46 formed by the hooks 32 of the disk 12, the force 72 applied on it by the snap ring 40 has, as a resultant, a radial force directed outwardly, which is added to the resultant of the centrifugal forces generated in the flange section 28.

The center of gravity 76 of the flange section 28 is axially spaced upstream of the point of contact 78 between the curved face 50 of the radially internal portion 48 of said flange section and the annular groove 46 of the disk 12, so that the force 70 applied to the flange section 28 generates a torque that tends to cause said flange section to rotate downstream about its point of contact 78 on the hooks 32 of the disk. This results in an axial force 80 directed downward and applied by the tabs 58 of the flange section 28 to the ring of metal matrix composite material 20, enabling the axial holding of the ring 20 on the disk to be reinforced.

As explained above, the annular snap rings 40, 42 therefore perform a second function consisting of increasing the rotation torque of the upstream 28 and downstream 30 annular flange sections about their contact areas 78 in the respective annular grooves 46 formed by the hooks 32 of the disk 12.

The example described above concerns a disk 12 of a turbine engine wheel of which the periphery is reinforced by two rings 20, 22 of metal matrix composite material, respectively upstream and downstream of the disk, but the invention also applies to disks reinforced by a single ring of this type upstream or downstream, or by a plurality of rings on a single radius upstream and/or downstream, and/or staged on different radii.

The invention therefore enables the use of rings of metal matrix composite material having a simple cross-section, for example, rectangular, that is particularly easy and economical to produce. The assembly of the annular flanges ensure the axial holding of said rings, according to the invention, is particularly easy since it simply consists of engaging the annular flange sections in a corresponding groove of the disk, then of mounting a resilient annular snap ring under each flange in order to prevent the flange sections from coming out of the groove of the disk.

The invention claimed is:

1. A wheel of a turbine engine, comprising:
    at least one rotor disk having blades;
    at least one ring of a metal matrix composite material mounted on the disk in order to take up centrifugal forces during operation;
    at least one annular flange formed by sections arranged end-to-end and each including a radially internal annular portion applied on a flank of the disk and a radially external portion coming into contact with the ring in order to ensure an axial holding of the the radially external portion on the disk; and
    means for radially holding flange sections on the disk,
    wherein the means for radially holding flange sections include a resilient annular snap ring applied on the disk and on a radially internal periphery of said flange sections, and
    wherein the snap ring is radially split and has at rest a diameter larger than an internal diameter of the flange.

2. A wheel according to claim 1, wherein the means for radially holding flange sections include hooks formed on the disk and in which the radially internal annular portions of said flange sections are radially engaged from the inside.

3. A wheel according to claim 1, wherein said resilient annular snap ring comprises at least two lugs arranged on each side of a radial slot and intended to be inserted into recesses with a complementary shape formed in the internal periphery of the flange sections.

4. A wheel according to claim 1, wherein an internal periphery of said flange sections and said resilient annular face of the snap ring in contact with the internal periphery form an angle of around 45 degrees with said flank of the disk.

5. A wheel according to claim 1, wherein centers of gravity of flange sections are axially spaced from points of contact of the flange sections on radial holding means provided on the disk so that centrifugal forces exerted, during operation, on said flange sections cause radially external portions of said flange sections to pivot toward the ring.

6. A wheel according to claim 1, wherein said at least one annular flange is made of a metal material.

7. A wheel according to claim 1, wherein said at least one annular flange includes 6 to 20 sections.

8. A wheel according to claim 1, wherein said resilient annular snap ring is made of a metal material.

9. A wheel according to claim 1, wherein said resilient annular snap ring comprises a coating with a low coefficient of friction on its surfaces of contact with said at least one annular flange and with said at least one rotor disk.

10. A wheel according to claim 1, including at least two rings of metal matrix composite material, mounted on upstream and downstream flanks, respectively, of the rotor disk.

11. A turbine engine, including at least one compressor, turbine or centrifugal impeller wheel according to claim 1.

* * * * *